United States Patent
Norby (10) Patent No.: US 9,325,656 B2
(45) Date of Patent: *Apr. 26, 2016

(54) NEGOTIATED CALL DELIVERY CAPABILITY

(71) Applicant: Qwest Communications International Inc., Denver, CO (US)

(72) Inventor: Steven E. Norby, Lafayette, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/490,568

(22) Filed: Sep. 18, 2014

(65) Prior Publication Data

US 2015/0006660 A1    Jan. 1, 2015

Related U.S. Application Data

(60) Division of application No. 13/489,162, filed on Jun. 5, 2012, now Pat. No. 8,866,868, which is a continuation of application No. 11/767,679, filed on Jun. 25, 2007, now Pat. No. 8,213,458, which is a continuation of application No. 09/881,360, filed on Jun. 13, 2001, now Pat. No. 7,251,252.

(51) Int. Cl.
*H04M 7/00* (2006.01)
*H04L 12/58* (2006.01)
*H04M 3/42* (2006.01)

(52) U.S. Cl.
CPC .............. *H04L 51/26* (2013.01); *H04L 51/36* (2013.01); *H04M 3/42229* (2013.01); *H04M 3/4211* (2013.01); *H04M 3/42068* (2013.01)

(58) Field of Classification Search
CPC ..................................... H04M 7/00; H04N 7/14
USPC ............ 379/221.01, 93.09; 348/14.01, 14.02, 348/14.08
See application file for complete search history.

(56) References Cited

U.S. PATENT DOCUMENTS

| | | |
|---|---|---|
| 5,077,732 A | 12/1991 | Fischer et al. |
| 5,307,059 A | 4/1994 | Connary et al. |
| 5,394,560 A | 2/1995 | Kane |
| 5,412,375 A | 5/1995 | Wood |
| 5,471,204 A | 11/1995 | Kudoh et al. |
| 5,485,282 A | 1/1996 | Takeda |

(Continued)

OTHER PUBLICATIONS

U.S. Appl. No. 11/767,679; Final Office Action dated Sep. 22, 2011; 11 pages.

(Continued)

*Primary Examiner* — Olisa Anwah
(74) *Attorney, Agent, or Firm* — Swanson & Bratschun, L.L.C.

(57) ABSTRACT

According to the invention, a method for establishing a personal communication between an originating end and a terminating end of a communication system is disclosed. In one step, a first number of personal communication modes associated with the originating end is retrieved. A determination is made if a second number of personal communication modes associated with the terminating end comprises any personal communication modes compatible with the first number of personal communication modes. A compatible personal communication mode from the first number of personal communication modes and the second number of personal communication modes is chosen to indicate the compatible personal communication mode to the terminating end.

20 Claims, 10 Drawing Sheets

(56) References Cited

U.S. PATENT DOCUMENTS

| | | |
|---|---|---|
| 5,495,412 A | 2/1996 | Thiessen |
| 5,504,837 A | 4/1996 | Griffith et al. |
| 5,557,749 A | 9/1996 | Norris |
| 5,604,491 A | 2/1997 | Coonley et al. |
| 5,613,213 A | 3/1997 | Naddell et al. |
| 5,727,950 A | 3/1998 | Cook et al. |
| 5,745,480 A | 4/1998 | Behtash et al. |
| 5,761,397 A | 6/1998 | Bagley et al. |
| 5,774,674 A | 6/1998 | Gutmann et al. |
| 5,805,301 A | 9/1998 | Rasanen |
| 5,815,081 A | 9/1998 | Motohashi |
| 5,936,547 A | 8/1999 | Lund |
| 5,943,397 A | 8/1999 | Gabin et al. |
| 5,969,636 A | 10/1999 | Parvulescu et al. |
| 5,987,440 A | 11/1999 | O'Neil et al. |
| 5,999,563 A | 12/1999 | Polley et al. |
| 6,021,158 A | 2/2000 | Schurr et al. |
| 6,044,107 A | 3/2000 | Gatherer et al. |
| 6,055,240 A | 4/2000 | Tunnicliffe |
| 6,061,570 A | 5/2000 | Janow |
| 6,134,434 A | 10/2000 | Krishnamurthi et al. |
| 6,141,328 A | 10/2000 | Nabkel et al. |
| 6,141,341 A | 10/2000 | Jones et al. |
| 6,160,639 A | 12/2000 | Lutgen et al. |
| 6,175,856 B1 | 1/2001 | Riddle |
| 6,181,940 B1 | 1/2001 | Rune |
| 6,188,907 B1 | 2/2001 | Reding et al. |
| 6,215,413 B1 | 4/2001 | Gaskill |
| 6,356,533 B1 | 3/2002 | Bruno et al. |
| 6,389,114 B1 | 5/2002 | Dowens et al. |
| 6,600,738 B1 | 7/2003 | Alperovich et al. |
| 6,618,763 B1 | 9/2003 | Steinberg |
| 6,633,630 B1 | 10/2003 | Owens et al. |
| 6,671,367 B1 | 12/2003 | Graf et al. |
| 6,704,571 B1 | 3/2004 | Moon |
| 6,760,602 B2 | 7/2004 | Tangorra et al. |
| 6,868,080 B1 | 3/2005 | Umansky et al. |
| 6,870,827 B1 | 3/2005 | Voit et al. |
| 7,124,167 B1 | 10/2006 | Bellotti et al. |
| 7,251,252 B2 | 7/2007 | Norby |
| 7,389,351 B2 * | 6/2008 | Horvitz .................. 709/227 |
| 8,213,458 B2 | 7/2012 | Norby |
| 8,866,868 B2 | 10/2014 | Norby |
| 2001/0048735 A1 | 12/2001 | O'Neal |
| 2002/0018487 A1 | 2/2002 | Chen et al. |
| 2002/0191639 A1 | 12/2002 | Norby |
| 2007/0250633 A1 | 10/2007 | Norby |
| 2012/0249721 A1 | 10/2012 | Norby |

OTHER PUBLICATIONS

U.S. Appl. No. 09/881,360; Final Rejection dated Feb. 22, 2007; 6 pages.
U.S. Appl. No. 09/881,360; Issue Notification dated Jul. 11, 2007; 1 page.
U.S. Appl. No. 09/881,360; Non-Final Rejection dated Apr. 7, 2006; 14 pages.
U.S. Appl. No. 09/881,360; Non-Final Rejection dated Jun. 10, 2005; 14 pages.
U.S. Appl. No. 09/881,360; Non-Final Rejection dated Sep. 13, 2006; 13 pages.
U.S. Appl. No. 09/881,360; Non-Final Rejection dated Nov. 1, 2005; 14 pages.
U.S. Appl. No. 09/881,360; Non-Final Rejection dated Dec. 3, 2004; 14 pages.
U.S. Appl. No. 09/881,360; Notice of Allowance dated May 7, 2007; 4 pages.
U.S. Appl. No. 11/767,679; Advisory Action dated Jun. 26, 2009; 4 pages.
U.S. Appl. No. 11/767,679; Final Rejection dated Mar. 24, 2009; 13 pages.
U.S. Appl. No. 11/767,679; Final Rejection dated Apr. 27, 2010; 14 pages.
U.S. Appl. No. 11/767,679; Issue Notification dated Jun. 13, 2012; 1 page.
U.S. Appl. No. 11/767,679; Non-Final Rejection dated Mar. 30, 2011; 14 pages.
U.S. Appl. No. 11/767,679; Non-Final Rejection dated Sep. 18, 2008; 14 pages.
U.S. Appl. No. 11/767,679; Non-Final Rejection dated Oct. 13, 2009; 12 pages.
U.S. Appl. No. 11/767,679; Notice of Allowance dated Mar. 6, 2012; 5 pages.
U.S. Appl. No. 13/489,162; Issue Notification dated Oct. 1, 2014; 1 page.
U.S. Appl. No. 13/489,162; Notice of Allowance dated Jun. 18, 2014; 12 pages.
U.S. Appl. No. 13/489,162; Requirement for Restriction/Election dated Apr. 8, 2014; 9 pages.

* cited by examiner

NEGOTIATED CALL DELIVERY CAPABILITY

CROSS REFERENCE TO RELATED APPLICATION

This application is a division of U.S. patent application Ser. No. 13/489,162, filed Jun. 5, 2012 by Steven E. Norby and titled, "Negotiated Call Delivery Capability", which is a continuation of U.S. patent application Ser. No. 11/767,679 (now U.S. Pat. No. 8,213,458), filed Jun. 25, 2007 by Steven E. Norby and titled, "Negotiated Call Delivery Capability,", which is a continuation of, and claims the benefit of, U.S. patent application Ser. No. 09/881,360, by Steven E. Norby, filed on Jun. 13, 2001 and titled "Negotiated Call Delivery Capability" (now U.S. Pat. No. 7,251,252), each of which is hereby incorporated by reference in its entirety.

BACKGROUND OF THE INVENTION

This invention relates in general to personal communication modes and, more specifically, to selection of personal communication modes.

In today's society, consumers have the choice of an ever-increasing number of ways to communicate with other consumers. Electronic devices, including items such as text or numeric pagers, cellular telephones, personal digital assistants (PDAs), facsimiles, and computers, are available and can be used in conjunction with other electronic services such as email and text messaging. These differing methods for communicating create problems for potentially interacting consumers because one of the parties for the intended communication may not utilize the same device or service as the other party. Also, the use of different combinations of electronic devices and services can create several compatibility issues that render the communication between intended parties impossible.

BRIEF DESCRIPTION OF THE DRAWINGS

The present invention is described in conjunction with the appended figures.

DESCRIPTION OF THE SPECIFIC EMBODIMENTS

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set for in the appended claims.

The present invention includes a method for the selection of personal communication modes across a transport network that links an originating end with a terminating end. More specifically, each end utilizes certain electronic devices for personal communication and would benefit from a determination of which personal communication modes are available for use in a given exchange of communication. This is made possible by having a number of personal communication modes available to the originating and terminating end available for use in a separate or common database that can be reviewed by each of the ends. When a contact is initiated, a decision mechanism is used to automatically determine if one or more personal communication modes exist that are compatible for communication. After the compatible modes have been identified, each end can then negotiate the desired communication mode for use in a given exchange of communication. Both the decision mechanism and the database of personal communication modes could either share a common location or exist independently. In addition, both the decision mechanism and the database of personal communication modes could be coupled to the transport network as a standard for the originating and terminating ends or directly to the personal communication devices as enhanced originating and terminating ends.

Figure 1:
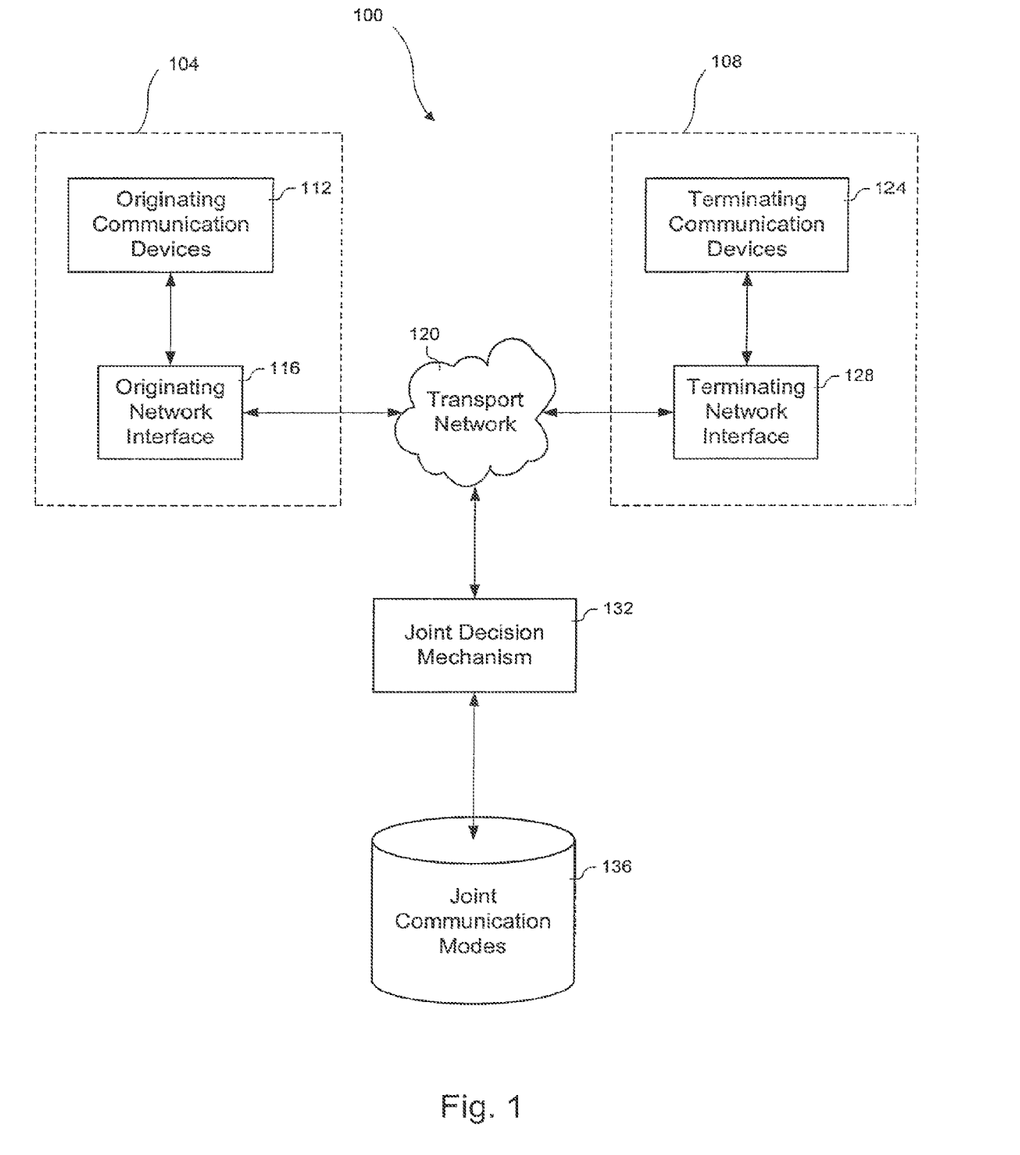
FIG. 1 is a block diagram of an embodiment of a personal communication system using a shared database of personal communication modes that is coupled to the network.

Referring to FIG. 1, a block diagram of an embodiment of a personal communication system 100 that uses a shared database of personal communication modes coupled to a transport network 120 is shown. In this embodiment, the personal communication system 100 links a basic originating end 104 and a basic terminating end 108 through a transport network 120. The basic originating end 104 is composed of a originating communication devices 112 and a originating network interface 116. The basic terminating end 108 is composed of a terminating communication devices 124 and a terminating network interface 128. Both a joint decision mechanism 132 and a database of joint communication modes 136 are coupled to the transport network 120.

The originating and terminating communication devices 112, 124 can include a number of devices that are available for a communication exchange between the basic originating end 104 and the basic terminating ends 108. These communication devices, such as a basic telephone, pager, personal computer, or facsimile, utilize a corresponding network interface 116, 128 to connect a particular device to the transport network 120. Refer to the discussion below of FIG. 4 for detailed descriptions of each device and its network interface 116, 128.

The transport network 120 is the technology used to enable communications between the basic originating end 104 and the basic terminating end 108. Also, the transport network enables communication between the joint decision mechanism 132 and the communication devices 112, 124 with their associated users for the purpose of selecting a communication mode. The transport network 120 can include such technologies as packet or circuit switching, UHF, carrier current, microwave, wireless, fiber optics, cable, and satellite communication. In this way, the transport network 120 enables the exchange of personal communication and the negotiation to find compatible communication modes.

The originating and terminating network interfaces 116, 128 are used to connect the originating communication devices 112 and terminating communication devices 124 to the transport network 120. These network interfaces 116, 128 may be separate for each corresponding device utilized or as part of a combined interface that accommodates multiple different communication devices 112,124.

The joint communication modes database 136 is a repository of personal communication modes stored in an electronic database that lists all of the originating and terminating communication devices 112, 124 that are available for use at the basic originating and terminating ends 104, 108 for negotiation of an acceptable communication mode. When the desire to establish communication is initiated by the basic originating end 104, the database of device preferences 136 is referenced by the joint decision mechanism 132 to determine if a compatible device exists at the terminating end 108. If the preferred communication device is not available, the joint decision mechanism 132 will automatically supply the originating end 104 with the options available for use, or otherwise pick a suitable communication mode.

The joint communication mode database 136 can be split into two such that each communication end 104, 108, has their own database 136 or, as in this embodiment, identified as a common database shared between both ends. In terms of location, it is possible to locate the database 136 somewhere on the transport network 120 or nearby the basic originating and/or basic terminating ends 104, 108. The database 136 may also store rankings or other information such as identification codes, routing numbers, mailing and/or address information to allow for the selection of a suitable communication mode or the distribution of information. In addition, the joint communication modes 136 may contain one or a number of databases associated with the basic originating and terminating ends 104, 108, each with its own algorithm for selecting and/or streamlining the exchange of communication.

The selection of personal communication modes utilizes a joint decision mechanism 132 that can be proximate to or distant from a connected database 136. This joint decision mechanism 132 employs the use of a decision tree and/or other algorithms to rank the personal communication modes at each given communication endpoint according to the availability of a particular communication device, its compatibility with a another communication device at the opposite end, or other factors. In addition, the joint decision mechanism 132 uses similar methodology or a separate decision tree to automatically match up the personal communication devices available at both the basic originating and terminating ends 104, 108 and rank them in a preferred order of utilization. The resulting compilation is then furnished to each end 104, 108 for the selection of the suitable communication mode by the personal communication device 112, 124 and/or user.

Figure 2:
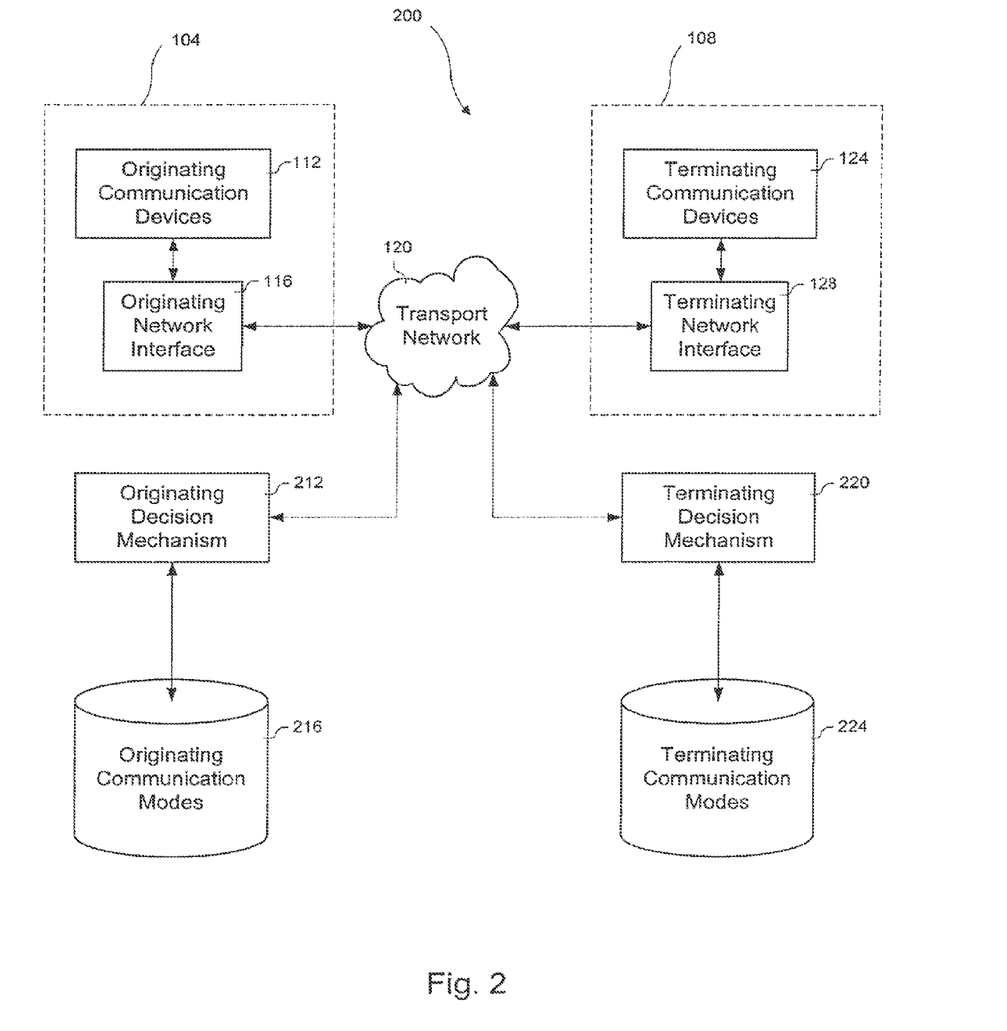
FIG. 2 is a block diagram of another embodiment of a personal communication system using separate databases of personal communication modes that are coupled to the network.

Referring to FIG. 2, a block diagram of another embodiment of a personal communication system 200 that uses separate databases 216, 224 of personal communication modes coupled to the transport network 120 is shown. More specifically, the basic originating end 104 uses a separate location for an originating decision mechanism 212 and a database of originating communication modes 216. The basic terminating end 108 uses a separate location for a terminating decision mechanism 220 and a database of terminal communication modes 224.

In this embodiment, the databases 216, 224 are separated in order to accommodate the independent generation and storage of the ranking criteria by the basic originating and terminating ends 104, 108. In addition, the databases 216, 224 may be separated based on the use of different communication services that constitute or are associated with the transport network 120 by the basic originating and terminating ends 104, 108. Similarly, the decision mechanisms 212, 220 may be utilized to accommodate different methods (e.g. decision trees and/or algorithms) preferred for the matching and selection of the personal communication modes by the basic originating and terminating ends 104, 108. The separation of these decision mechanisms 212, 220 may also occur due to an compatibility issue associated with accessing of the database or other reasons.

The function of the databases 216, 224 containing the originating and terminating communication modes 216, 224 is the same whereby each stores a list of all of the personal communication devices 112, 124 that are available for use at the respective basic originating and terminating ends 104, 108. During the communication process, the basic originating end 104 will access and send its own list of one or more originating communication modes 216 through the transport network 120 to the terminating decision mechanism 220 for review. The terminating decision mechanism 220 will automatically cross-reference its own database of terminating communication modes 224 to check for device compatibility. If the preferred originating communication device 112 is not available, it will supply the originating decision mechanism 212 through the transport network 120 with one or more alternatives until communication can be established or the decision to terminate the exchange is made by either the basic originating end 104 or the basic terminating end 108.

The databases 216, 224 interact based on requests for a given personal communication mode initiated by either the basic originating end 104 or the basic terminating end 108. Similarly, one or both of the originating and terminating decision mechanisms 212, 220 are involved in negotiating an acceptable communication mode. These types of interactions may occur because the decision mechanisms 212, 220 are in the process of negotiating an acceptable mode of communication and may require multiple exchanges before a selection is made. Also, a selection made by a user at either the basic originating or terminating end 104, 108 may override any automatic decision mechanism 212, 220 to provide other matching options.

Figure 3:
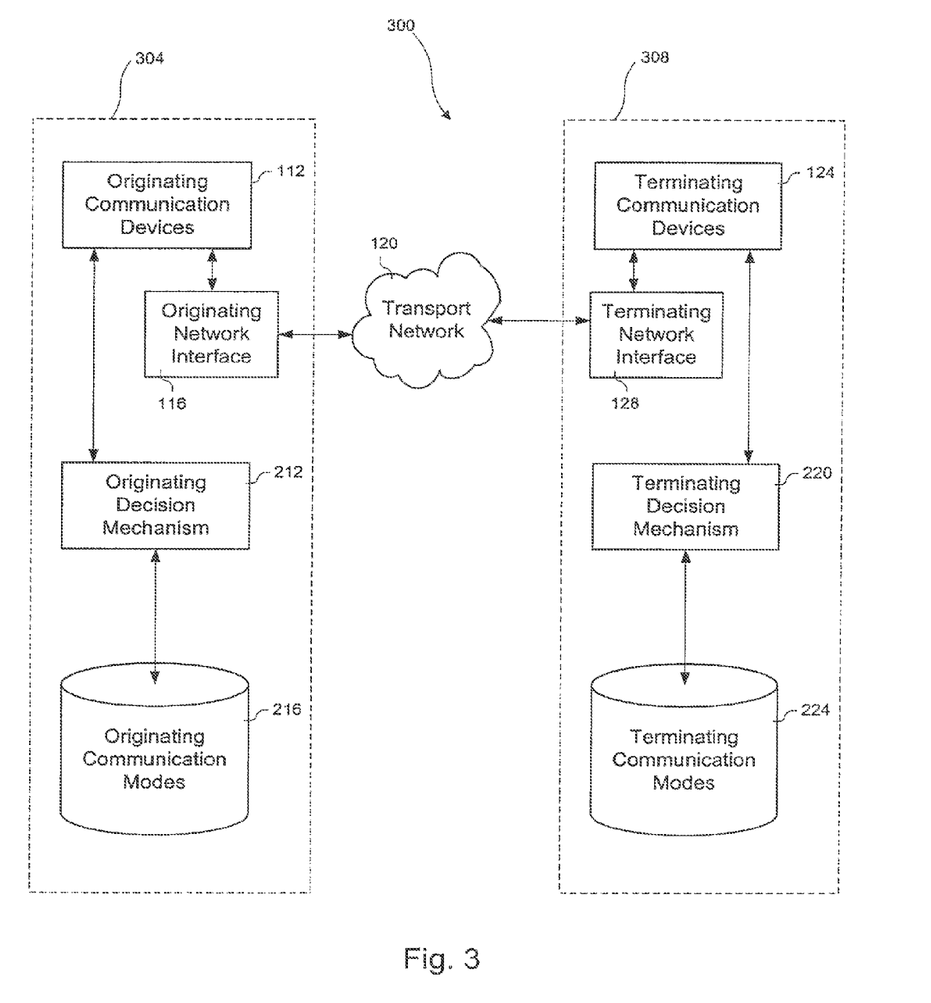
FIG. 3 is a block diagram of yet another embodiment of a personal communication system using separate databases of personal communication modes that are coupled to the personal communication devices.

Referring to FIG. 3, a block diagram of yet another embodiment of a personal communication system 300 that uses separate databases 216, 224 of personal communication modes coupled to the personal communication devices 112, 124 is shown. In this embodiment, the personal communication system 300 is composed of a enhanced originating end 304 and a enhanced terminating end 308 coupled together by the transport network 120. The personal communication system 300, shown in FIG. 3, is distinguished from the personal communication system 200 of FIG. 2 by the ability of the enhanced originating or terminating ends 304, 308 to access its corresponding database of personal communication modes 216, 224, as well as its corresponding originating decision mechanism 212 and terminating decision mechanism 220, prior to an exchange of communication through the transport network 120. The result of which may include any of the following changes associated with: the communication exchange rate, the number of database accesses required to determine an available mode, the decision rate, the effectiveness of the negotiation process, the connection time to the transport network 120, and overall efficiency of the system 300.

This embodiment of a personal communication system 300 illustrates the enhancement of the communication devices 112, 124. This enhancement could take place external or internal to the one or more of the communication devices, whereby the external version can be linked in ways such as via an internal communication network, the Internet, or a dedicated connection; and the internal version call for the incorporation of both the decision mechanism 212, 220 and its corresponding database 216, 224 as part of its set of operational components. Similarly, joining both the decision mechanism 212, 220 and its corresponding database 216, 224 with the communication devices 112, 124 can occur at one or both enhanced originating or terminating ends 304, 308.

Figure 4:
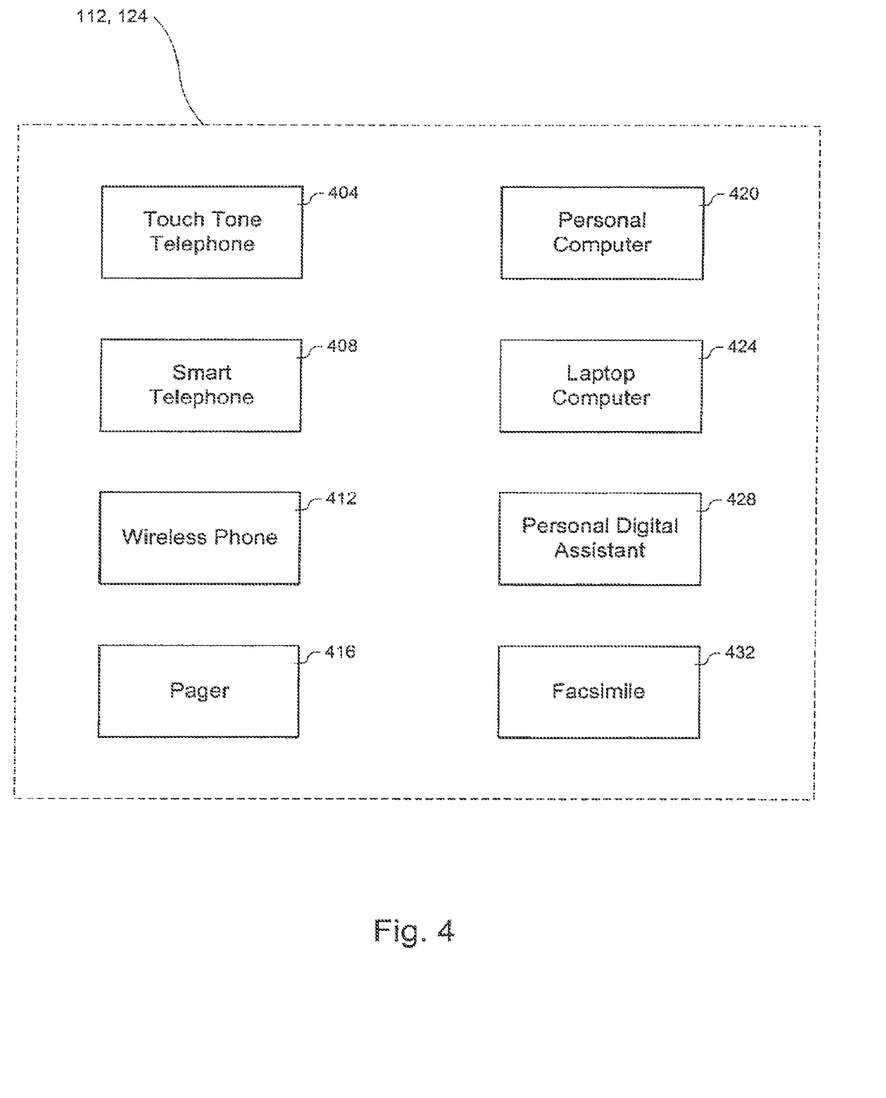
FIG. 4 is a block diagram of an embodiment of personal communication devices for either the originating and terminating ends.

Referring to FIG. 4, a block diagram of an embodiment of the different types of personal communication devices 112, 124 is shown. These types of devices include a touch tone telephone 404 that has no other intelligence capabilities other than the analog or digital exchange of voice communication and includes a cordless telephone; citizen's band (CB) or ship to shore radio; a smart telephone 408 that has other intelligence capabilities besides analog or digital exchange of voice communication; a wireless telephone 412 which includes cellular, radio, or satellite technologies; a pager 416 which includes analog, digital or hybrid devices; a personal computer 420 which includes all desktop, workstation or user terminals; a laptop computer 424 which includes all portable competition systems that are not hand-held; a personal digital assistant 428 which includes all hand-held computation devices; electronic translation or appointment reminder computers; Internet appliances; and a facsimile machine 432.

Several of these communication devices 112, 124 may have some modifications to function in the personal communication system 100, 200, 300 such that an internal or external system allows the communication devices 112,124 to prompt for and accept information from the user. The touch tone telephone 404 provides voice prompts in the semi-automatic mode and utilize a touch pad to select the options given to the system user. The smart telephone 408, wireless telephone 412, pager 416, and facsimile 432 incorporates a display screen (e.g. liquid crystal display (LCD)) to review the selections provided by the other communicating party in addition to the touch tone pad requirements for making a selection. Some communication devices 112, 124 could include an internal or external speech recognition capability to allow selections. The external speech recognition could be centrally maintained across the transport network 120.

To facilitate a communication exchange, different network interfaces 116, 128 are used for different communication devices 112, 124. The touch tone telephone 404 excluding the wireless telephone 412, CB or ship to shore radio), smart telephone 408, cordless phone, and facsimile 432 use a network interface 116, 128 utilizes a telephone cord, outlet jack, and a POTS connection to a central switching office of the transport network 120. The wireless phone 412 (including CB or ship to shore radio), pager 416, and personal digital assistant devices 428 use a network interface that includes a radio frequency (RF) modulator and antenna which are coupled to cell site or other transceiver. The personal computer 420 and laptop computer 424 use a network interface 116, 128 that utilize cables, an infrared connection, a wireless link (e.g., Bluetooth or wireless ethernet), a wall jack, a modem, and/or a network connection (including an ISP, a cable modem, a digital subscriber line (DSL), personal communication services (PCS), and cellular data service, etc.). The network interface could be to a peer computer, LAN, server, etc.

The process of establishing personal communication or automatically establishing a compatible personal communication mode uses a network transport 120 which can support any of the following: facsimile communication, text pager messaging, numeric pager messaging, text wireless phone messaging, instant messaging, electronic mail messaging, telegraph messaging, telegram messaging, voice over switched network communication, voice over packet switched network, voice over Internet protocol, wireless voice phone communication, cordless voice phone communication, citizen's band over radio communication, ship-to-shore over radio communication, voice over radio communication, satellite phone communication, voice mail messaging, video teleconferencing, and video phone communication.

Figure 5:
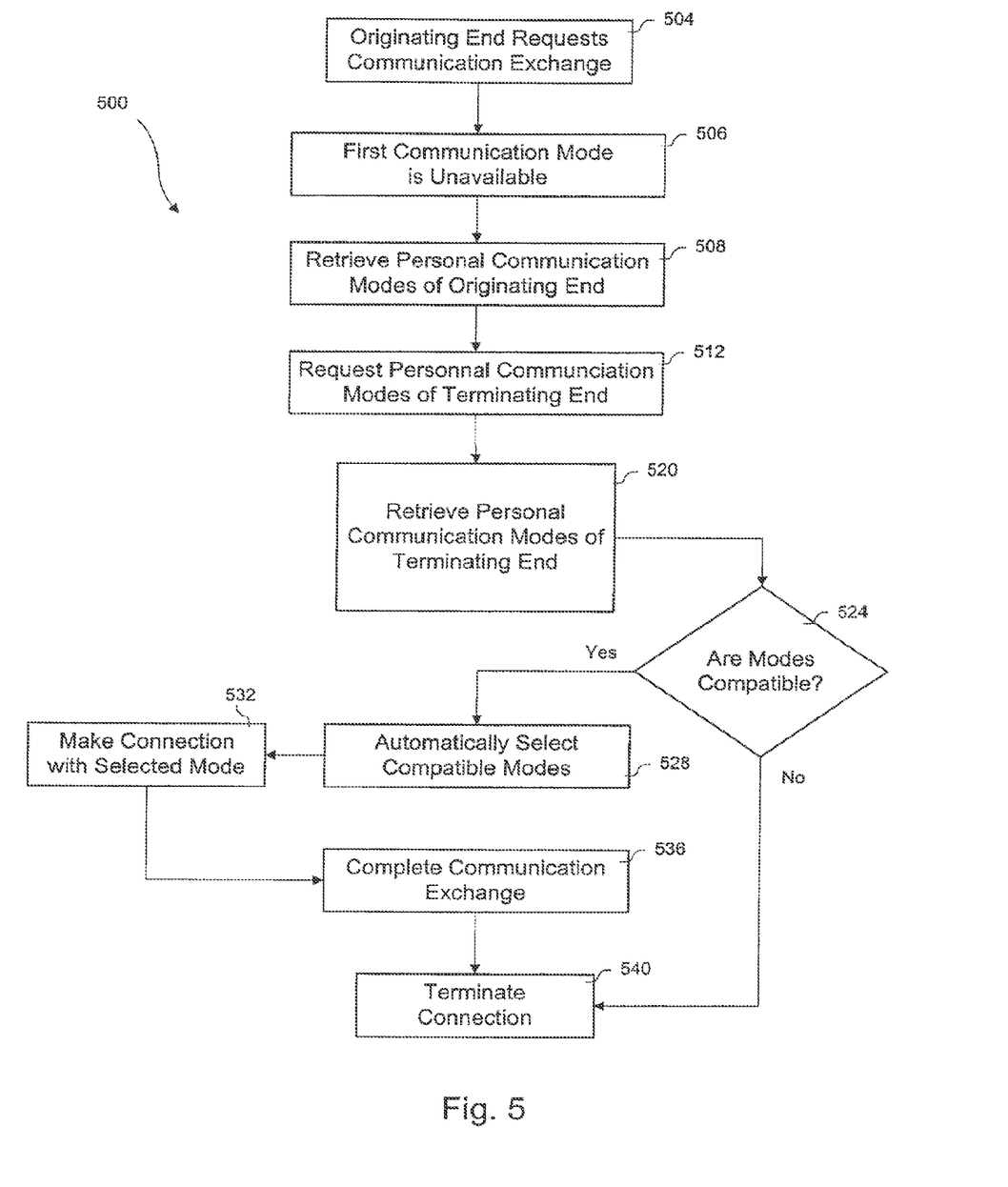
FIG. 5 is a flow diagram of an embodiment of a process for automatic selection of compatible personal communication modes.
Figure 9:
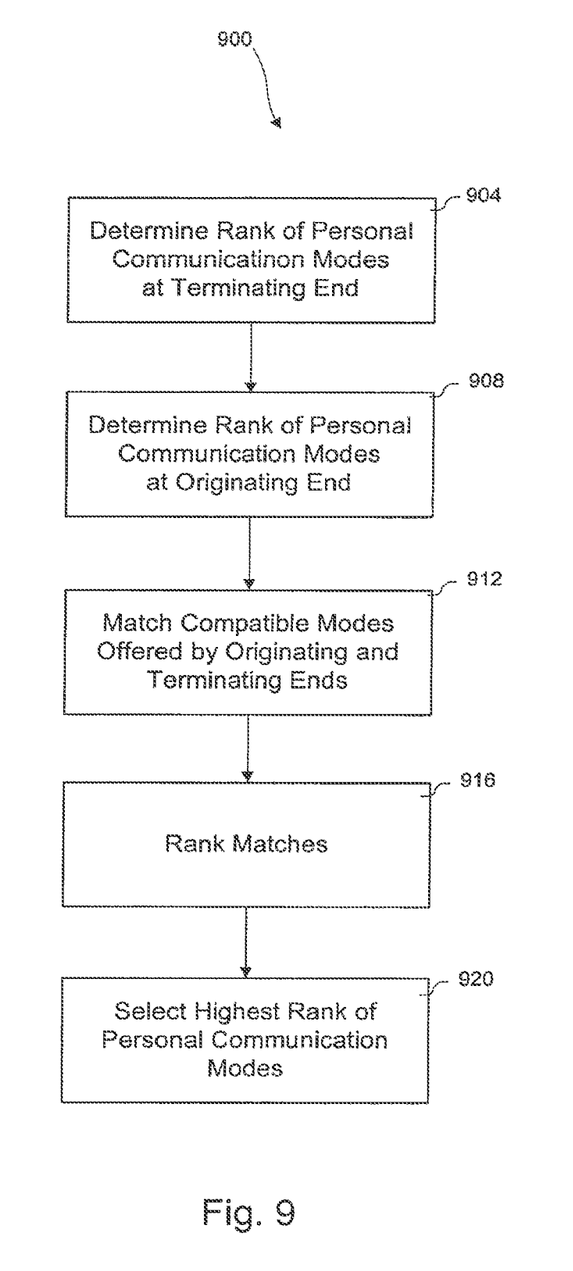
FIG. 9 is a flow diagram of an embodiment of a process describing a ranking of personal communication modes.
Figure 10:
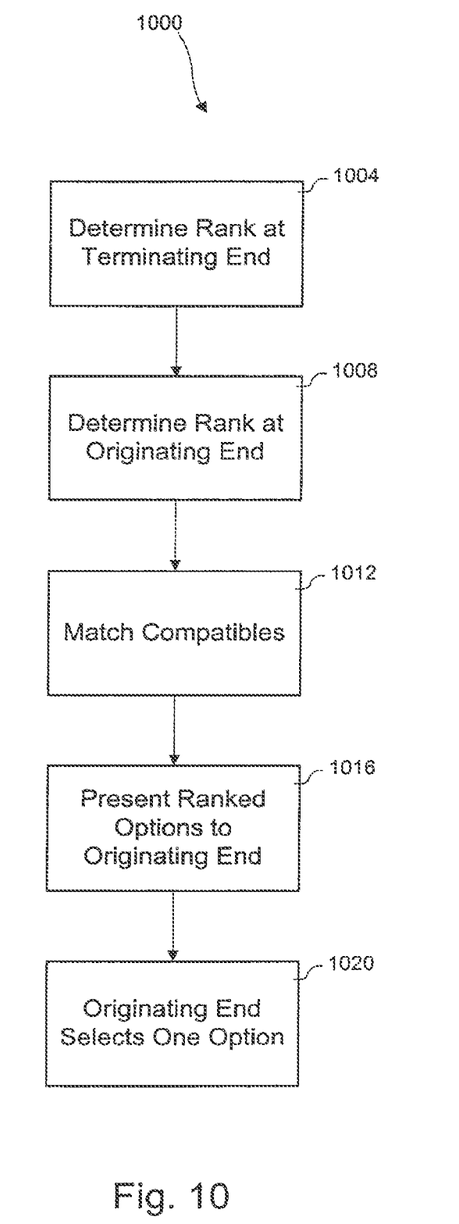
FIG. 10 is a flow diagram of an embodiment of a process describing a semi-automatic selection of personal communication modes.

The following terminology is used in FIG. 5, through FIG. 10, inclusive. In general, personal communication modes refers to either joint communication modes 136 in FIG. 1 or originating and terminating communication modes 216, 224 in FIGS. 2 and 3. Similarly, the general use of the terms originating end and terminating end refers to either basic originating or terminating ends 104, 108 in FIGS. 1 and 2 or enhanced originating or terminating ends 304, 308 in FIG. 3. To simplify the discussion, the communication devices 112, 124 are characterized as being either an originator or a terminator of a communication, iv but most communication devices 112, 124 can function equally well in either role.

Referring first to FIG. 5, a flow diagram of an embodiment of a process 500 that describes the interaction between the originating and terminating ends 104, 108 whereby the selection of compatible personal communication modes is performed automatically. The initial request for a communication exchange is made in step 504 where the first communication mode is unavailable in step 506 of this example. In step 508, the terminating end 108 retrieves the personal communication modes from the database 216 associated with the originating end 104. In similar fashion, step 512 depicts the request made by the originating end 104 for the personal communication modes available from the database 224 associated with the terminating end 108. If one or more common personal communication modes are available, step 520 retrieves the preferred modes from the database 224 of the terminating end 108 through the transport network 120.

The first decision of the negotiation process occurs in step 524, whereby the originating end 104 determines if any personal communication modes are in common with the terminating end 108. If the available personal communication devices 112, 124 are not compatible, the connection is terminated in step 540. If the available personal communication devices 112, 124 are compatible, step 528 performs an automatic selection of compatible modes and then proceeds to step 536 whereby personal communication is exchanged until the connection is terminated in step 540. Various embodiments may have this selection decision made proximate to the terminating or originating ends or elsewhere on the transportation network 120.

Figure 6:
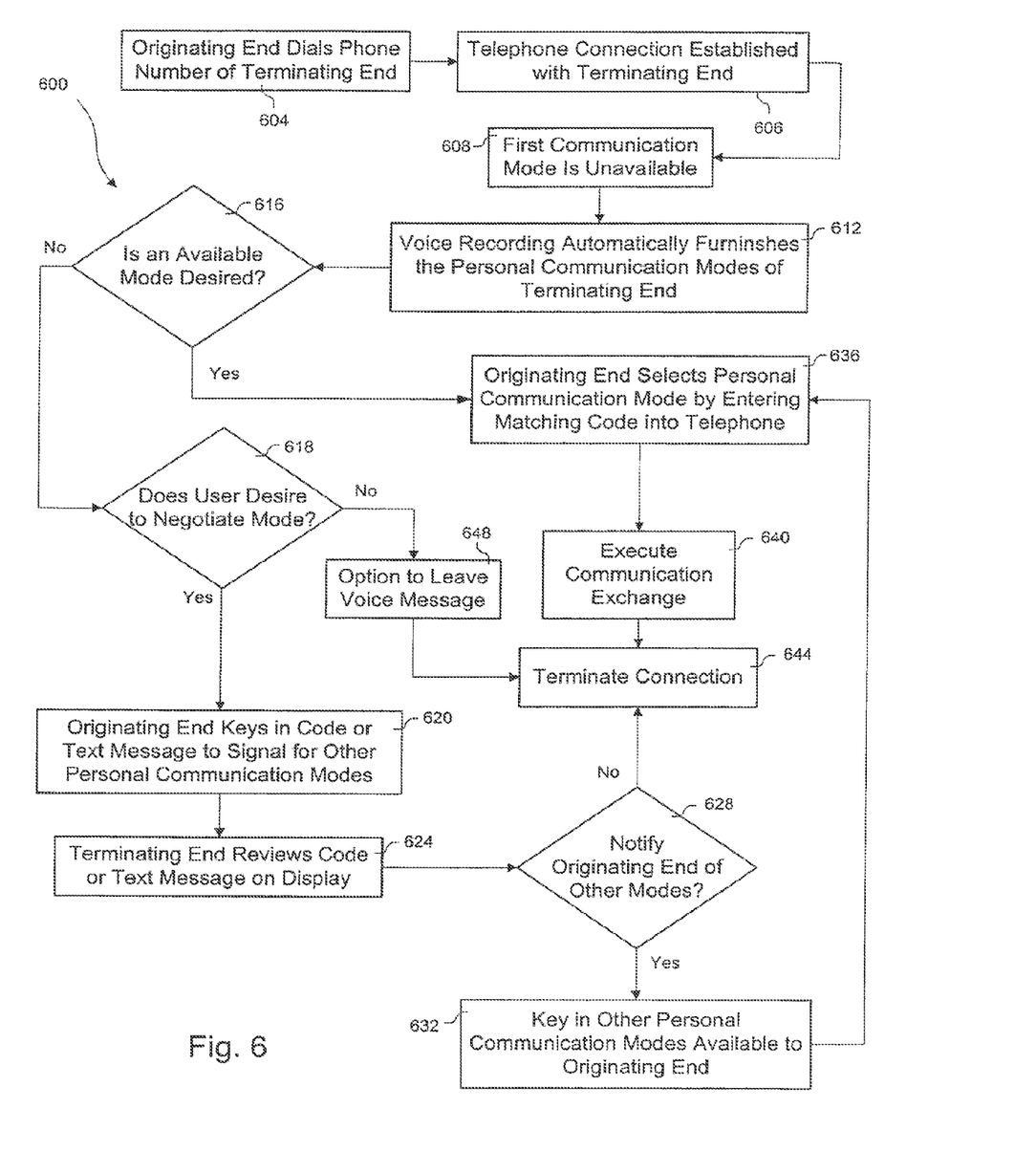
FIG. 6 is a flow diagram of an embodiment of a process that shows the interaction between the originating and terminating ends using a telephone at both ends to select the personal communication modes.

Referring to FIG. 6, a flow diagram of an embodiment of a process 600 that describes the interaction between the originating and terminating ends 104, 108 whereby the selection of compatible personal communication modes is performed using a telephone (e.g., touch tone telephone 404, smart telephone 408, or wireless telephone 412) with a screen display (e.g. LCD) at each end 104, 108. In steps 604 through 608, the originating end 104 dials the telephone number of the terminating end 108 in step 604, a connection through the transport network 120 is established with the terminating end 108 in step 606, but the first communication mode is unavailable (e.g. user is on another line, a different communication mode is preferred, or user not familiar with originating end based on Caller ID reference) in step 608.

In step 612 of this embodiment, the process for negotiating an available communication modes begins when the originating end is automatically furnished with one or more of the personal communication modes using a pre-recorded message supplied by either the originating end, terminating end or some other point coupled to the transport network 120. Each communication mode listed would have a corresponding key pad designation (e.g. number, symbol letter, Braille symbol) for selection by the originating end 104. Some embodiments could use voice recognition instead of using a keypad to select the communication mode. If an available mode of communication is desired in step 616, the user associated with the originating end 104 manually enters the corresponding number, letter, symbol, or braille designation using the touch tone key pad on the telephone in step 636. This selection enables both the originating and terminating end 104, 108 to proceed with the exchange of personal communication in step 640 until the connection is terminated in step 644. If an available mode of communication is not desired in step 616, the originating end is given a choice in step 618 to negotiate another communication mode with the terminating end 108.

Step 618 provides the originating end 104 with the option to contact the terminating end 108 with an offer to negotiate other personal communication modes. If the originating end 104 does not desire to negotiate other modes, step 648 gives the option to leave a voice message (e.g., using a voicemail service or a suitable recording device if such service is available) or directly terminate the connection in step 644. If the originating end 104 does desire to negotiate other available modes, step 620 is executed whereby the originating end 104 uses the touch tone key pad, voice commands or another input mechanism to enter an alpha-numeric code corresponding to a chosen personal communication mode. This code requesting the use of other communications modes is sent through the transport network 120 to the terminating end 108.

In step 624, the terminating end 108 receives the request for additional communications modes from the originating end 104 that is displayed on a visual output device (e.g., a LCD screen, a VDT, a LED display, etc.) associated with the telephone (e.g., touch tone telephone 404, smart telephone 408, or wireless telephone 412) at the terminating end 108. Step 628 gives the terminating end 108 the option to notify the originating end 104 if other personal communication modes are available. If no other modes are available in 628, the connection is terminated in step 644. If other communication modes are available in 628, step 636 is executed whereby the terminating end keys in other available personal communication modes using the touch tone key pad or other input mechanism. This keyed response is then sent back through the transport network 120 to the originating end 104 for a repeat of step 636 as detailed above.

Figure 7:
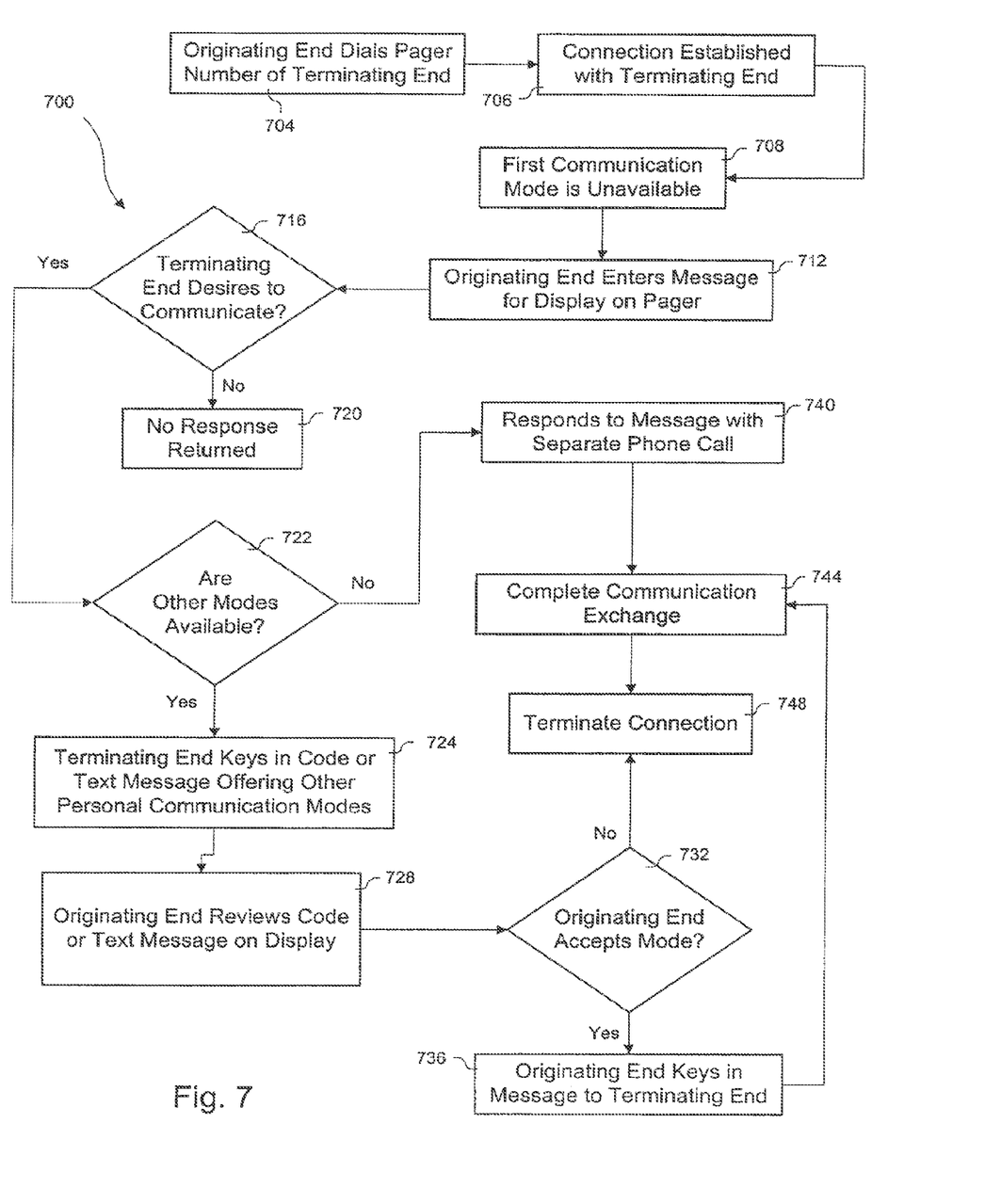
FIG. 7 is a flow diagram of an embodiment of a process that shows the interaction between the originating and terminating ends using a telephone and a pager or facsimile machine to select the personal communication modes.

Referring to FIG. 7, a flow diagram of an embodiment of a process 700 that describes the interaction between the originating and terminating ends 104, 108 whereby the selection of compatible personal communication modes is executed using a telephone (e.g., a touch tone telephone 404, smart telephone 408 or wireless telephone 412) with a screen display and a pager 416. This selection process remains identical should the pager 416 be replaced with a facsimile machine 432.

In steps 704 through 708, the originating end 104 dials the pager number of the terminating end 108 in step 704, a connection through the transport network 120 is established with the terminating end 108 in step 706, but the first communication mode is unavailable (e.g. user is unable to return the page, a different communication mode is preferred, or user not familiar with originating end based on Caller ID reference) in step 708.

Step 712 begins the process for negotiating acceptable communication modes whereby the originating end 104 enters a alpha-numeric message using the touch tone key pad on the telephone for review by the terminating end 108 using the screen display on the pager 416. In step 716, the terminating end 108 decides if personal communication with the originating end 104 is desired. If the terminating end 108 does not want to communicate, the connection can be ended by returning no response to the originating end 104 or by sending a reject communication signal to the originating end 104 in step 720. If the terminating end 108 decides to communicate with the originating end 104 in step 716, the terminating end 108 is given the choice to key in an alpha-numeric message in step 724 that offers other personal communication modes available for use or respond to the message with a separate telephone call in step 740. This response in step 740 allows the originating and terminating end 104, 108 to proceed with the exchange of personal communication in step 744 until the connection is terminated in step 748.

In the event that the terminating end executes step 724 using the key pad on the pager 416, the process proceeds to step 728 whereby the originating end can review the message from the terminating end using the screen display of the telephone. If the desired mode of communication is unacceptable in step 732, the connection is terminated in step 748. If the desired mode of communication is acceptable in step 732, the originating end manually enters an alpha-numeric message for distribution back through the transport network 120 to the terminating end in step 736. The result is the exchange of personal communication in step 744 until the connection in terminated in step 748.

Figure 8:
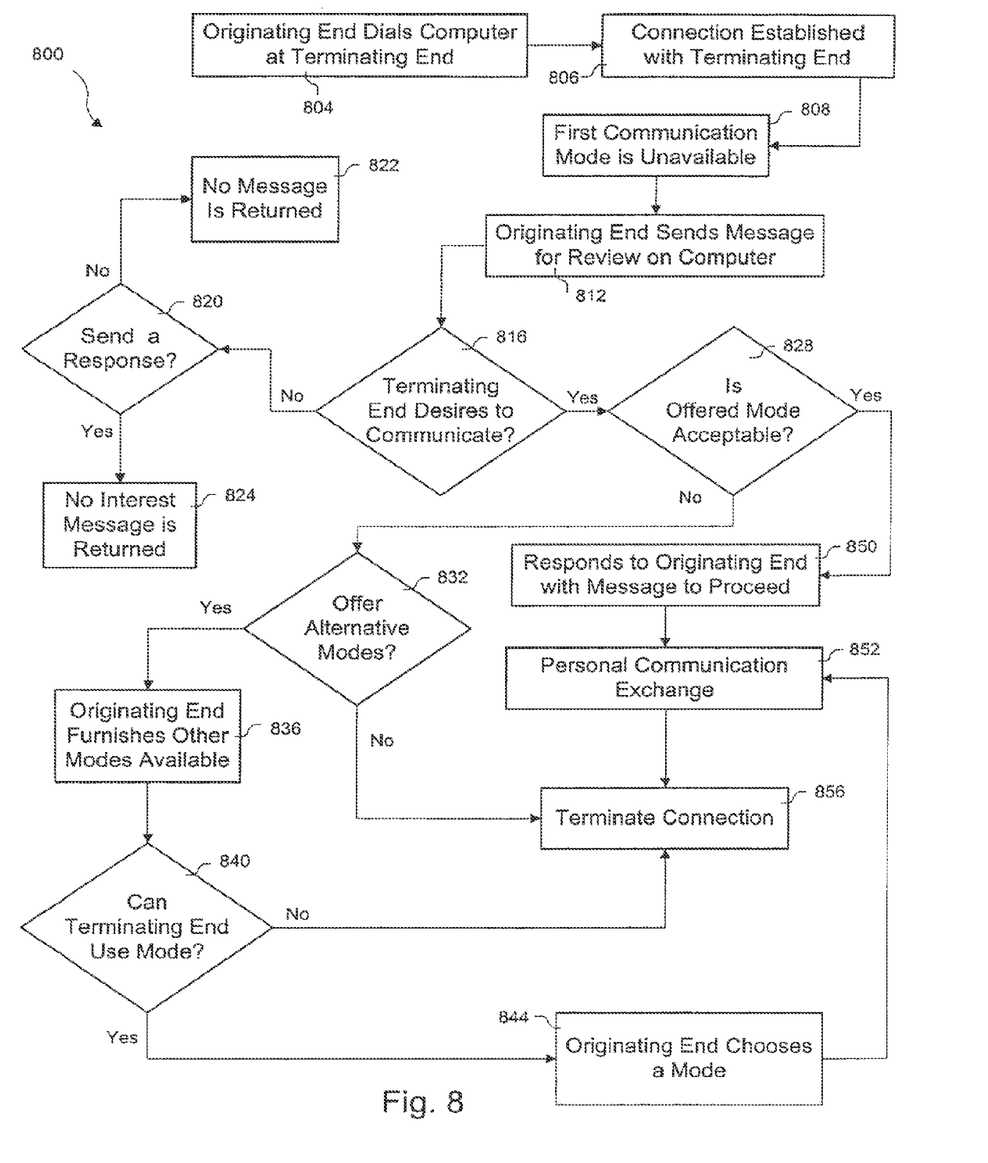
FIG. 8 is a flow diagram of an embodiment of a process that shows the interaction between the originating and terminating ends using a telephone and a computer to select the personal communication modes.

Referring to FIG. 8, a flow diagram of an embodiment of a process 800 that describes the interaction between the originating and terminating ends 104, 108 whereby the selection of compatible personal communication modes is performed using a telephone (e.g., a touch tone telephone 404, smart telephone 408 or wireless telephone 412) with a screen display and a computer (e.g., personal computer 420, laptop computer 424 or personal digital assistant 428).

In steps 804 through 808, the originating end 104 dials the telephone number associated with the computer 420 at the terminating end 108 in step 804, a connection through the transport network 120 is established with the terminating end 108 in step 806, but the first communication mode is unavailable (e.g. user is already online with no second communication line or a different communication mode is preferred) in step 808.

Step 812 begins the process for negotiating preferred communication modes whereby the originating end 104 uses the telephone touch pad to enter a message (e.g. alpha-numeric or voice) for review on the computer 420 at the terminating end 108. In step 816, the terminating end 108 decides if personal communication with the originating end 104 is desired. If the terminating end 108 decides not to communicate with the originating end 104 in step 816, the terminating end 108 has the option in step 820 to send a response back to the originating end 104. This response could be either step 822 whereby no message is returned or step 824 whereby a courtesy message (e.g. voice or email) is returned (e.g. automatically or user initiated) stating that the terminating end 108 has no interest in communicating. If the terminating end 108 decides to communicate with the originating end 104 in step 816, the process continues in step 828 with a decision by the terminating end 108 to accept at least one personal communication mode offered by the originating end 104.

Step 828 continues onto step 850 when the terminating end 108 accepts at least one personal communication mode offered by the originating end 104. In step 850, the terminating end 108 sends a response through the transport network 120 allowing the originating end 104 to select the desired communication mode and proceed onward to step 852 in which personal communication is exchanged. Once completed, step 856 is executed wherein the connection is terminated.

Step 828 continues onto a decision in step 832 when the terminating end 108 does not accept at least one personal communication mode offered by the originating end 104. The decision in step 832 is to determine if the originating end 104 has any other personal communication mode available for use in a communication exchange. If no other alternative modes are available in step 832, the connection is terminated in step 856. If one or more alternative modes are available, the process continues with step 836 whereby the originating end furnishes the list of other modes available to the terminating end 108.

Step 840 is a further illustration of the function of the decision mechanism 220 such that the database 224 of the terminating end 108 is accessed to determine if the offered personal communication mode is compatible. If the mode is unacceptable, the connection is terminated in step 856. If the mode is acceptable, the process continues with step 844 and the originating end 104 chooses either voice mail or an email message which leads to a complete communication exchange in step 852 and the termination of the connection in 856.

Referring to FIG. 9, a flow diagram of an embodiment of a process 900 that ranks personal communication modes. In step 904, an originating end 104 and a terminating end 108 generate a separate list of their personal communication modes. Both lists of modes are stored in a joint database 136 for access by a joint decision mechanism 132. These modes can be manually entered into a database 136 or the memory (e.g. random access memory) of a communication device 112, 124 using a keyboard, a key pad, a touch screen, and/or speech recognition. In addition, the modes can be stored as either a static (e.g. playback-only device such as voice prompts) or interactive (e.g. allows for the playback of the message and the selection of an option) voice recording using a telephone or microphone that is linked to a computer or recording device, including services such as voice mail. Some embodiments could have a web-based interface to enter the communication modes and other information.

In step 908, each personal communication mode is automatically prioritized by preference and mode availability. In step 912, the ranked lists of personal communication modes prepared by the basic originating and terminating ends 104, 108 are used to generate a compiled list that contains all matched modes between the two ends 104, 108. Step 916 illustrates that another ranking process is performed on the compiled list of matched modes. The output of this ranking enables both the originating and terminating end to be able to quickly select the most effective personal communication mode that is available between the two ends 104, 108. If a given option becomes unavailable due to a malfunction or some temporary disconnect, the decision mechanism proceeds down a utilization list to find the next highest ranking mode for use.

For example, the terminating end 108 has five different communication modes available for use. Each is listed in a database 136 and given a prioritization ranking, namely voice mail=1, facsimile=2, alpha-numeric pager=3, email=4, and wireless voice phone communication=5. The originating end 104 executes an independent process for evaluating the preference for its seven available personal communication modes and concludes with the following list stored in a database 136: email=1, voice mail=2, teletype=3, wireless voice phone communication=4, facsimile=5, alpha-numeric pager=6, and telegram messaging=7. At the time of an intended communication exchange, a union of the two lists is generated for matching the modes based on the compatibility of available communication devices 112, 124. The resulting list of combined usage reveals the following: email=5, voice mail=3, wireless voice phone communication=9, facsimile=7, and alpha-numeric pager=9. This list of matching modes is then ranked in terms of priority where lower sums are preferred over higher sums. The resulting order of utilization is voice mail=1, email=2, facsimile=3, and wireless voice phone communication=4. Of course, other criteria and methods can be used to determine the ranking process, conditions for acceptable matching modes, rules for mode elimination, and noted case exceptions.

Referring to FIG. 10, a flow diagram of an embodiment of a process 1000 that describes a semi-automatic ranking and selection of personal communication modes. This process involves a combination of user interaction with the execution of automatic ranking or selection of stored modes according to the decision tree and/or algorithms with the respective decision mechanism 212, 220.

In step 1004, the terminating end has the discretion as to how the terminating communication devices 124 will be ranked. This choice or series of choices can form the basis of a decision tree and/or other algorithms that constitute the basis for the terminating decision mechanism 220. Such rankings can include of a wide variety of methods such as device efficiency, cost, work loads, number available, age, etc. The only possible exception occurs when a joint decision mechanism 132 is utilized whereby ranking inputs are received by both the originating and terminating ends or conceived by an independent, third party to serve as an operational standard. Once the rankings of the terminating communication devices 124 are completed, the results are stored in the database 224 associated with the terminating communication modes.

In step 1008, the originating end has the discretion as to how the originating communication devices 112 will be ranked. This choice or series of choices can form the basis of a decision tree and/or algorithms that constitutes the basis for the originating decision mechanism 212. Such rankings can include of a wide variety of methods such as device efficiency, cost, work loads, number available, age, etc. The only possible exception occurs when a joint decision mechanism 132 is utilized whereby ranking inputs are received by both the originating and terminating ends or conceived by an independent, third party to serve as an operational standard. Once the rankings of the originating communication devices 124 are completed, the results are stored in the database 216 associated with the originating communication modes.

Step 1012 executes the decision mechanisms 212, 220 to automatically generate a list of matched compatibles for the exchange of personal communication. Similar to the ranking methods mentioned above, this process can be executed based on a wide variety of matching criteria including, but not limited to, exact matches, within manufacturer's specifications, within a relative range or based on operational features. In addition, even broader matching criteria could include such instructions as attempt all connections or limited only based on power requirements.

In step 1016, the originating end is presented with the resulting ranked options using a display device or voice prompts. This process could be performed automatic by electronic equipment whereby the matched modes are stored as a temporary database that resides in one or more locations including that of the respective communication device 112, 124 or within the databases of the personal communication modes 216, 224. Conversely, the process could be based on the human or technological sophistication of one or both of the originating and terminating ends 104, 108 whereby the resulting matches could be written down manually and referenced each time a decision is made.

Step 1020 completes the process such that the originating end 104 selects one of the matched options and such that the originating end 104 is able to exchange communication with the terminating end 108. This selection step 1020 could be a simple task such as pressing a button on a touch tone key pad or speaking a corresponding code into a telephone. The process could be more complex whereby the originating end may also request a series of steps be performed such as preparing a written response or speaking a pass phrase for handwriting or voice identity verifications after entry of a pass code.

The ranking of personal communication modes can be achieved using a variety of methods, with or without interaction with the user. For example, a fully-automatic system can be utilized whereby a communication exchange takes place using computers at both the originating and terminating ends 104, 108. Also, a semi-automatic or hybrid system is possible whereby interaction with the user at one end is utilized as a subset of the decision process. Lastly, a full interaction between users is possible for the selection and use of personal communication modes.

In light of the above description, a number of advantages of the present invention are readily apparent. For example, this process allows the originating end to offer a number of personal communication modes to the terminating end. This option increases the likelihood that a connection between the originating and terminating ends may be made in a more timely fashion. Similarly, this process creates a more effective method for the originating and terminating end to exchange information in such a form that is both compatible with and convenient for each end. Without such a system, one or more connections and terminations may become necessary for the completion of an effective exchange of information between the same two parties.

A number of variations and modifications of the invention can also be used. For example, the negotiation process can take place between any two combinations of the same or different personal communication devices that are defined above. Such methods for effective interaction between an originating and terminating end is made possible by linking one or more databases that contain all the personal communication modes available with decision mechanisms that automate the process. Also, the scope is greatly increased because the aforementioned elements can reside in a location that is either independent of or connected to the transport network.

While the principles of the invention have been described above in connection with specific apparatuses and methods, it is to be clearly understood that this description is made only by way of example and not as limitation on the scope of the invention.

What is claimed is:

1. A method for establishing a personal communication between a first user device and a second user device, the method comprising:
    receiving, at a preference resolver device, a first prioritized list of a first plurality of personal messaging modes of which the first user device is capable, in order of preference of a first user of the first device;
    receiving, at the preference resolver device, a second prioritized list of a second plurality of personal messaging modes of which the second user device is capable, in order of preference of a second user of the second device;
    comparing, with the preference resolver device, the first prioritized list with the second prioritized list;
    automatically identifying, with the preference resolver device, a preferred personal messaging mode for communication between the first user device and the second user device over a communication network, the preferred personal messaging mode comprising a highest ranked match from each of the first and second prioritized lists; and
    communicating the preferred personal messaging mode from the preference resolver device to at least one of the user devices.

2. The method of claim 1, wherein:
    the first and second plurality of personal messaging modes each comprise voice communication and video communication;
    the first user device initially communicates with the second user device using voice communication;
    the first prioritized list is generated from a user selection received at the first user device;
    the second prioritized selection is generated from a user selection received at the second user device;
    automatically identifying a preferred personal messaging mode comprises determining that both the first user selection and the second user selection comprise a video communication selection; and
    the method further comprises establishing video communication between the first user device and the second user device, in response to identifying video communication as the preferred personal messaging mode.

3. The method of claim 1, wherein the first user device or the second user device comprises the preference resolver device.

4. The method of claim 1, wherein the preference resolver device is separate from the first user device and the second user device.

5. The method of claim 1, wherein the first plurality of personal messaging modes comprises wireless phone text messaging, instant messaging, electronic mail messaging, voice over switched network communication, and voice over Internet protocol communication, wireless voice phone communication, cordless voice phone communication, voice mail messaging, and video teleconferencing.

6. The method of claim 1, wherein the first plurality of personal messaging modes consists of voice over switched network communication and voice over Internet protocol communication.

7. The method of claim 1, wherein the first prioritized list is stored in a database that is remote from the first user device.

8. The method of claim 1, further comprising:
the first user device initially communicating with the second user device using a first personal messaging mode, wherein the first personal messaging mode is different from the preferred personal messaging mode; and
the first user device communicating with the second user device using the preferred personal messaging mode after the preferred personal messaging mode has been identified.

9. The method of claim 1, wherein at least one of the prioritized lists is generated by user selection from among a plurality of available personal messaging modes.

10. The method of claim 9, wherein the user selection is received by one of the user devices after an initial communication between the first user device and the second user device.

11. A system for establishing a personal communication between a first user device and a second user device, the system comprising:
a communication network; and
a preference resolver device in communication with the communication network, wherein the preference resolver device:
receives a first prioritized list of a first plurality of personal messaging modes of which the first user device is capable, in order of preference of a first user of the first device;
receives a second prioritized list of a second plurality of personal messaging modes of which the second user device is capable, in order of preference of a second user of the second device;
compares the first prioritized list with the second prioritized list;
automatically identifies a preferred personal messaging mode for communication between the first user device and the second user device over a communication network, the preferred personal messaging mode comprising a highest ranked match from each of the first and second prioritized lists; and
communicates the preferred personal messaging mode to at least one of the user devices.

12. The system of claim 11, wherein:
the first and second plurality of personal messaging modes each comprise voice communication and video communication;
the first user device initially communicates with the second user device using voice communication;
the first prioritized list is generated from a user selection received at the first user device;
the second prioritized selection is generated from a user selection received at the second user device;
automatically identifying a preferred personal messaging mode comprises determining that both the first user selection and the second user selection comprise a video communication selection; and
the preference resolver device further establishes video communication between the first user device and the second user device, in response to identifying video communication as the preferred personal messaging mode.

13. The system of claim 11, wherein the first user device or the second user device comprises the preference resolver device.

14. The system of claim 11, wherein the preference resolver device is separate from the first user device and the second user device.

15. The system of claim 11, wherein the first plurality of personal messaging modes comprises wireless phone text messaging, instant messaging, electronic mail messaging, voice over switched network communication, and voice over Internet protocol communication, wireless voice phone communication, cordless voice phone communication, voice mail messaging, and video teleconferencing.

16. The system of claim 11, wherein the first plurality of personal messaging modes consists of voice over switched network communication and voice over Internet protocol communication.

17. The system of claim 11, wherein the first prioritized list is stored in a database that is remote from the first user device.

18. The system of claim 11, wherein:
the first user device initially communicates with the second user device using a first personal messaging mode, wherein the first personal messaging mode is different from the preferred personal messaging mode; and
the first user device communicates with the second user device using the preferred personal messaging mode after the preferred personal messaging mode has been identified.

19. The system of claim 11, wherein at least one of the prioritized lists is generated by user selection from among a plurality of available personal messaging modes.

20. The method of claim 19, wherein the user selection is received by one of the user devices after an initial communication between the first user device and the second user device.

* * * * *